United States Patent
Kim et al.

(10) Patent No.: US 11,082,256 B2
(45) Date of Patent: Aug. 3, 2021

(54) SYSTEM FOR CONTROLLING NETWORK ACCESS OF TERMINAL BASED ON TUNNEL AND METHOD THEREOF

(71) Applicant: PRIBIT Technology, Inc., Seoul (KR)

(72) Inventors: Young Rang Kim, Seoul (KR); Min Jae Lee, Seoul (KR); Pil Ho Song, Seoul (KR); Joo Tae Kim, Seoul (KR)

(73) Assignee: PRIBIT Technology, Inc., Seoul (KR)

( * ) Notice: Subject to any disclaimer, the term of this patent is extended or adjusted under 35 U.S.C. 154(b) by 0 days.

(21) Appl. No.: 17/030,918

(22) Filed: Sep. 24, 2020

(65) Prior Publication Data

US 2021/0091976 A1 Mar. 25, 2021

Related U.S. Application Data

(63) Continuation-in-part of application No. 16/580,974, filed on Sep. 24, 2019, and a continuation-in-part of application No. 16/580,866, filed on Sep. 24, 2019.

(30) Foreign Application Priority Data

Mar. 12, 2020 (KR) .................. 10-2020-0030721

(51) Int. Cl.
*H04L 12/46* (2006.01)
*H04L 29/06* (2006.01)
*H04L 12/66* (2006.01)

(52) U.S. Cl.
CPC ...... *H04L 12/4633* (2013.01); *H04L 12/4666* (2013.01); *H04L 12/66* (2013.01); *H04L 63/10* (2013.01)

(58) Field of Classification Search
CPC . H04L 12/4633; H04L 12/4666; H04L 12/66; H04L 63/10
See application file for complete search history.

(56) References Cited

U.S. PATENT DOCUMENTS

| 7,606,902 B2 | 10/2009 | Rao et al. |
| 7,978,714 B2 | 7/2011 | Rao et al. |

(Continued)

FOREIGN PATENT DOCUMENTS

| JP | 2007243655 A | 9/2007 |
| JP | 2011015327 A | 1/2011 |

(Continued)

OTHER PUBLICATIONS

KR Office Action; Application No. 10-2020-0117543; dated Nov. 13, 2020; 6 pages.

(Continued)

*Primary Examiner* — Asad M Nawaz
*Assistant Examiner* — Kai Chang
(74) *Attorney, Agent, or Firm* — Whitmyer IP Group LLC

(57) ABSTRACT

A node includes: a communication circuit; a processor operatively connected to the communication circuit; and a memory operatively connected to the processor and storing a target application and an access control application, wherein the memory stores instructions that when executed by the processor, cause the node to: detect a network access event of the target application to a destination network through the access control application, identify whether a tunnel corresponding to identification information of the target application and the destination network and authorized by an external server exists, transmit a data packet of the target application through the authorized tunnel using the communication circuit, when the authorized tunnel exists, and drop the data packet of the target application, when the authorized tunnel does not exist.

16 Claims, 16 Drawing Sheets

(56) References Cited

U.S. PATENT DOCUMENTS

| | | | |
|---|---|---|---|
| 8,019,868 | B2 | 9/2011 | Rao et al. |
| 8,291,119 | B2 | 10/2012 | Rao et al. |
| 8,363,650 | B2 | 1/2013 | Rao et al. |
| 8,843,998 | B2 * | 9/2014 | Fu .................. H04L 67/10 726/3 |
| 8,892,778 | B2 | 11/2014 | Rao et al. |
| 8,897,299 | B2 | 11/2014 | Rao et al. |
| 9,106,538 | B1 | 8/2015 | Asnis |
| 9,143,942 | B2 | 9/2015 | Agarwal et al. |
| 9,240,938 | B2 | 1/2016 | Dimond et al. |
| 9,578,052 | B2 | 2/2017 | Cp et al. |
| 9,715,597 | B2 | 7/2017 | Smith et al. |
| 9,984,230 | B2 | 5/2018 | Pikhur et al. |
| 10,033,766 | B2 | 7/2018 | Gupta et al. |
| 10,162,767 | B2 | 12/2018 | Spurlock et al. |
| 10,176,344 | B2 | 1/2019 | Smith et al. |
| 10,205,743 | B2 | 2/2019 | Cp et al. |
| 10,243,833 | B2 | 3/2019 | Tang et al. |
| 10,326,672 | B2 | 6/2019 | Scheib et al. |
| 10,339,303 | B2 | 7/2019 | Mehta et al. |
| 10,402,577 | B2 | 9/2019 | Knapp et al. |
| 2002/0163920 | A1 * | 11/2002 | Walker .................. H04L 63/164 370/401 |
| 2006/0029062 | A1 | 2/2006 | Rao et al. |
| 2006/0029063 | A1 | 2/2006 | Rao et al. |
| 2006/0029064 | A1 | 2/2006 | Rao et al. |
| 2006/0037071 | A1 | 2/2006 | Rao et al. |
| 2010/0002693 | A1 | 1/2010 | Rao et al. |
| 2013/0014206 | A1 | 1/2013 | Rao et al. |
| 2013/0128892 | A1 | 5/2013 | Rao et al. |
| 2013/0232263 | A1 | 9/2013 | Kelly et al. |
| 2013/0322255 | A1 * | 12/2013 | Dillon .................. H04L 43/0888 370/236 |
| 2014/0101716 | A1 | 4/2014 | Touboul |
| 2015/0121449 | A1 | 4/2015 | Cp et al. |
| 2015/0347768 | A1 | 12/2015 | Martin et al. |
| 2016/0092700 | A1 | 3/2016 | Smith et al. |
| 2016/0180092 | A1 | 6/2016 | Aktas |
| 2016/0182550 | A1 | 6/2016 | Spurlock |
| 2016/0359673 | A1 | 12/2016 | Gupta et al. |
| 2016/0371484 | A1 | 12/2016 | Mehta et al. |
| 2016/0378685 | A1 | 12/2016 | Spudock et al. |
| 2016/0378975 | A1 | 12/2016 | Pikhur et al. |
| 2016/0379003 | A1 | 12/2016 | Kapoor et al. |
| 2016/0381051 | A1 | 12/2016 | Edwards et al. |
| 2017/0078184 | A1 | 3/2017 | Tang et al. |
| 2017/0118228 | A1 | 4/2017 | Cp et al. |
| 2017/0339631 | A1 * | 11/2017 | Pugaczewski ........ H04L 63/101 |
| 2018/0013786 | A1 | 1/2018 | Knopf |
| 2018/0018476 | A1 | 1/2018 | Smith et al. |
| 2019/0109822 | A1 * | 4/2019 | Clark .................. H04L 63/0428 |
| 2019/0109848 | A1 * | 4/2019 | Clark .................. H04L 63/1441 |
| 2019/0155752 | A1 | 5/2019 | Spurlock et al. |
| 2019/0173736 | A1 | 6/2019 | Ponnuswamy et al. |
| 2019/0173891 | A1 | 6/2019 | Cp et al. |
| 2019/0222559 | A1 * | 7/2019 | Wang .................. G06F 9/45558 |
| 2019/0278908 | A1 | 9/2019 | Mehta et al. |
| 2019/0306035 | A1 | 10/2019 | Scheib et al. |
| 2019/0349369 | A1 | 11/2019 | Bengtson et al. |
| 2020/0244625 | A1 * | 7/2020 | Tummalapenta ... H04L 63/0272 |

FOREIGN PATENT DOCUMENTS

| | | |
|---|---|---|
| JP | 5239341 B2 | 7/2013 |
| JP | 2017537501 A | 12/2017 |
| KR | 20020088728 A | 11/2002 |
| KR | 100692653 B1 | 3/2007 |
| KR | 20070037650 A | 4/2007 |
| KR | 20070102698 A | 10/2007 |
| KR | 20120045859 A | 5/2012 |
| KR | 1020130045919 A | 5/2013 |
| KR | 20130076798 A | 7/2013 |
| KR | 20140055857 A | 5/2014 |
| KR | 1020140074357 A | 6/2014 |
| KR | 1020150013453 A | 2/2015 |
| KR | 20150088494 A | 8/2015 |
| KR | 101561108 B1 | 10/2015 |
| KR | 101578193 B1 | 12/2015 |
| KR | 20160056118 A | 5/2016 |
| KR | 20160123069 A | 10/2016 |
| KR | 20170010835 A | 2/2017 |
| KR | 101743559 B1 | 6/2017 |
| KR | 1020170063795 A | 6/2017 |
| KR | 1020180019273 A | 2/2018 |
| KR | 1020180030023 A | 3/2018 |
| KR | 1020180032864 A | 4/2018 |
| KR | 101910605 B1 | 10/2018 |
| KR | 1020180132868 A | 12/2018 |
| KR | 1020190036504 A | 4/2019 |
| KR | 20190052541 A | 5/2019 |
| KR | 20190073114 A | 6/2019 |
| KR | 102119257 B1 | 6/2020 |
| WO | 2016190641 A1 | 12/2016 |

OTHER PUBLICATIONS

Korean Notice of Allowance; Applicaiton No. KR 10-2020-0030721; dated May 2, 2021.

Korean Notice of Allowance; Application No. KR 10-2020-0105345; dated May 2, 2021.

Cloud Security Alliance, "SDP specification 1.0"; Software Defined Perimeter Working Group; Apr. 2014; 28 Pages.

Cloud Security Alliance, "Software-Defined Perimeter"; Architecture Guide; Mar. 10, 2020, Machine Translation; 43 Pages.

Japanese Office Action; Application No. 2021-039780; dated Jun. 8, 2021; 13 Pages.

* cited by examiner

SYSTEM FOR CONTROLLING NETWORK ACCESS OF TERMINAL BASED ON TUNNEL AND METHOD THEREOF

TECHNICAL FIELD

The present disclosure relates to a technology for controlling network access of a terminal based on a tunnel in a network environment.

BACKGROUND

Multiple devices may communicate data through a network. For example, a smartphone may transmit or receive data to and from a server through the Internet. The network may include a private network such as an intranet as well as a public network such as the Internet.

SUMMARY

The present disclosure has been made to solve the above-mentioned problems occurring in the prior art while advantages achieved by the prior art are maintained intact.

In order to control indiscriminate access to the network, a technology for restricting access to the network is applied based on transmission control protocol (TCP)/internet protocol (IP).

For example, a network access controller (NAC) is a method that allows an authorized terminal to access the network by receiving an authorized IP address and blocks an unauthorized terminal by using address resolution protocol (ARP) spoofing when the unauthorized terminal uses an unauthorized IP address. A firewall is a method of determining whether to allow transmission of a data packet based on source IP, destination IP, and port information included in IP header information and a policy. A virtual private network (VPN) is a method of ensuring integrity and confidentiality of data packets by using a tunnel to which encryption is applied over the TCP/IP protocol.

However, the ARP spoofing puts a load on the network, and recently, a technology to bypass the ARP spoofing has been developed. Since the firewall is to control a flow of data packets, it may not be directly involved in a process of generating a connection between two nodes. In addition, the VPN is vulnerable to managing the flow of data packets after the tunnel is generated. In addition, the above-mentioned technologies are based on the TCP/IP, and may be thus vulnerable to security for other layers (e.g., application layers) among open system interconnection (OSI) layers.

Various exemplary embodiments disclosed in the present disclosure are intended to provide a system for solving the above-described problem in a network environment and a method thereof.

According to an exemplary embodiment of the present disclosure, a node includes a communication circuit; a processor operatively connected to the communication circuit; and a memory operatively connected to the processor and storing a target application and an access control application, wherein the memory stores instructions that when executed by the processor, cause the node to: detect a network access event of the target application to a destination network through the access control application, identify whether a tunnel corresponding to identification information of the target application and the destination network and authorized by an external server exists, transmit a data packet of the target application through the authorized tunnel using the communication circuit, when the authorized tunnel exists, and drop the data packet of the target application, when the authorized tunnel does not exist.

According to another exemplary embodiment of the present disclosure, a server includes a communication circuit; a memory storing a database; and a processor operatively connected to the communication circuit and the memory, wherein the processor is configured to: receive a first request that requests network access of a target application stored in a node to a destination network from an access control application of the node, the first request including identification information of a control flow, identification information of the target application, and identification information of the destination network, identify whether the target application is accessible based on the identification information of the control flow and the database, identify whether an authorized tunnel exists between the target application and a gateway of the destination network based on the database, the identification information of the target application, and the identification information of the destination network, when target application is accessible, and transmit the identified result to the access control application using the communication circuit.

According to another exemplary embodiment of the present disclosure, a gateway is configured to: receive a data packet from a node, identify whether the received data packet is received through a tunnel authorized by an external server, forward the data packet to a destination network, when the data packet is received through the authorized tunnel, and drop the data packet, when the data packet is not received through the authorized tunnel.

According to another exemplary embodiment of the present disclosure, a node includes a communication circuit; a processor operatively connected to the communication circuit; and a memory operatively connected to the processor and storing a target application and an access control application, wherein the memory stores instructions that when executed by the processor, cause the node to: detect a network access event of the target application to a destination network through the access control application, request network access to the destination network to the external server using the communication circuit, receive a first response to the network access request from the external server, identify whether an available tunnel exists based on the first response, transmit the data packet of the target application through the available tunnel using the communication circuit, when the available tunnel exists, and drop the data packet of the target application, when the available tunnel does not exist.

BRIEF DESCRIPTION OF THE DRAWINGS

The above and other objects, features and advantages of the present disclosure will be more apparent from the following detailed description taken in conjunction with the accompanying drawings.

In connection with the description of the drawings, the same or similar reference numerals may be used for the same or similar components.

DETAILED DESCRIPTION

Figure 1:
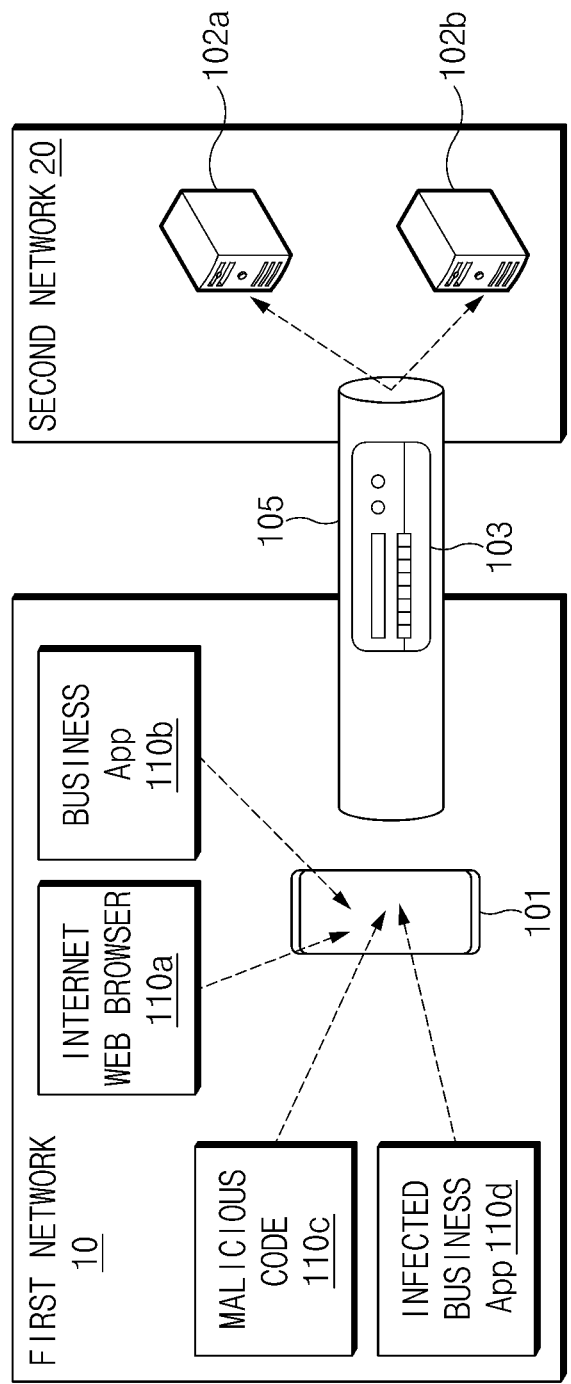
FIG. 1 illustrates an environment including a plurality of networks.

Hereinafter, various exemplary embodiments of the present disclosure will be described with reference to the accompanying drawings. However, it is to be understood that technologies mentioned in the present disclosure are not limited to specific exemplary embodiments, but include various modifications, equivalents, and/or alternatives according to exemplary embodiments of the present disclosure.

In the present disclosure, the singular form of a noun corresponding to an item may include one or more of the items unless clearly indicated otherwise in a related context. In the present disclosure, each of the phrases such as "A or B", "at least one of A and B", "at least one of A or B", "A, B or C", "at least one of A, B and C" and at least one of "A, B, or C" may include any one of the items listed together in the corresponding one of the phrases, or all possible combinations thereof. Terms such as "first" and "second" may be used simply to distinguish a corresponding component from other corresponding components, and do not limit the corresponding components in other aspects (e.g., importance or order). When any (e.g., first) component is referred to as "coupled" or "connected" to another (e.g., second) component, with or without the terms "functionally" or "communicatively", it means that any component may be connected to another component directly (e.g., by wire), wirelessly, or via a third component.

Each component (e.g., module or program) of the components described in the present disclosure may include a singular number or a plurality of entities. According to various exemplary embodiments, one or more components or operations among the corresponding components may be omitted, or one or more other components or operations may be added. Alternatively or additionally, a plurality of components (e.g., modules or programs) may be integrated into one component. In this case, the integrated component may perform one or more functions of each component of the plurality of components in the same or similar manner as that performed by the corresponding component among the plurality of components prior to the integration. According to various exemplary embodiments, the operations performed by the module, the program, or other components may be executed in a sequential, parallel, iterative, or heuristic manner, or one or more of the operations may be executed in a different order or omitted, or one or more other operations may be added.

The term "module" used in the present disclosure includes a unit implemented in hardware, software, or firmware, and may be used interchangeably with terms such as, for example, logic, logic blocks, parts, or circuits. The module may be an integrally configured component or a minimum unit of the component or a part thereof that performs one or more functions. For example, according to an exemplary embodiment, the module may be implemented in the form of an application-specific integrated circuit (ASIC).

Various exemplary embodiments of the present disclosure may be implemented as software (e.g., a program or application) including one or more instructions stored in a storage medium (e.g., a memory) readable by a machine. For example, a processor of the machine may invoke and execute at least one of the one or more stored instructions from the storage medium. This makes it possible for the machine to be operated to perform at least one function according to the at least one invoked instruction. The one or more instructions may include code generated by a compiler or code executable by an interpreter. The machine-readable storage medium may be provided in the form of a non-transitory storage medium. Here, the term "non-transitory" simply means that the storage medium is a tangible device and does not contain signals (e.g., electromagnetic waves), and such a term does not distinguish between a case where data is stored semi-permanently in the storage medium and a case where data is temporarily stored in the storage medium.

The method according to various exemplary embodiments disclosed in the present disclosure may be provided as being included in a computer program product. The computer program product may be traded as a product between a seller and a purchaser. The computer program product may be distributed in the form of a machine-readable storage medium (e.g., compact disc read only memory (CD-ROM)), or may be distributed (e.g., downloaded or uploaded) online, through an application store (e.g., Play Store™) or directly between two user devices (e.g., smartphones). In the case of the online distribution, at least some of the computer program product may be temporarily stored or temporarily generated in a machine-readable storage medium such as a memory of a server of a manufacturer, a server of an application store, or a relay server.

FIG. 1 illustrates an environment including a plurality of networks.

Referring to FIG. 1, a first network 10 and a second network 20 may be networks different from each other. For example, the first network 10 may be a public network such as the Internet, and the second network 20 may be a private network such as an intranet or a VPN.

The first network 10 may include a terminal 101. In FIG. 1 and the embodiments described below, a 'terminal' may be a device of various types capable of performing data communication. For example, the terminal 101 may include a portable device such as a smartphone or a tablet, a computer device such as a desktop or laptop, a multimedia device, a medical device, a camera, a wearable device, a virtual reality (VR) device, or a home appliance, and is not limited to the devices described above. The terminal 101 may also be referred to as an 'electronic device' or a 'node'.

The terminal 101 may attempt to access the second network 20 and transmit data to servers 102a and 102b included in the second network 20. The terminal 101 may transmit the data to the servers 102a and 102b through a gateway 103 and a tunnel 105. FIG. 1 illustrates an example in which the second network 20 includes only the servers, but according to various exemplary embodiments, the second network 20 may further include an electronic device or terminal such as the terminal 101.

When the access of the terminal 101 to the first network 10 is approved, the terminal 101 may communicate with all servers included in the first network 10, and accordingly, the terminal 101 may be exposed from an attack by a malicious program. For example, the terminal 101 may receive data of untrusted or unsecured applications such as a malicious code 110c and an infected business application 110d as well as trusted and/or secure applications such as an Internet web browser 110a and a business application 110b.

The terminal 101 infected by the malicious program may attempt to access and/or transmit data to the second network 20. When the second network 20 is formed based on IP such as a VPN, the second network 20 may be difficult to individually monitor a plurality of devices included in the second network 20, and may be vulnerable to security for an application layer or a transport layer in an OSI layer. In addition, when the terminal 101 includes a malicious application after the tunnel has already been generated, data of the malicious application may be transmitted to other electronic devices in the second network 20.

Figure 2:
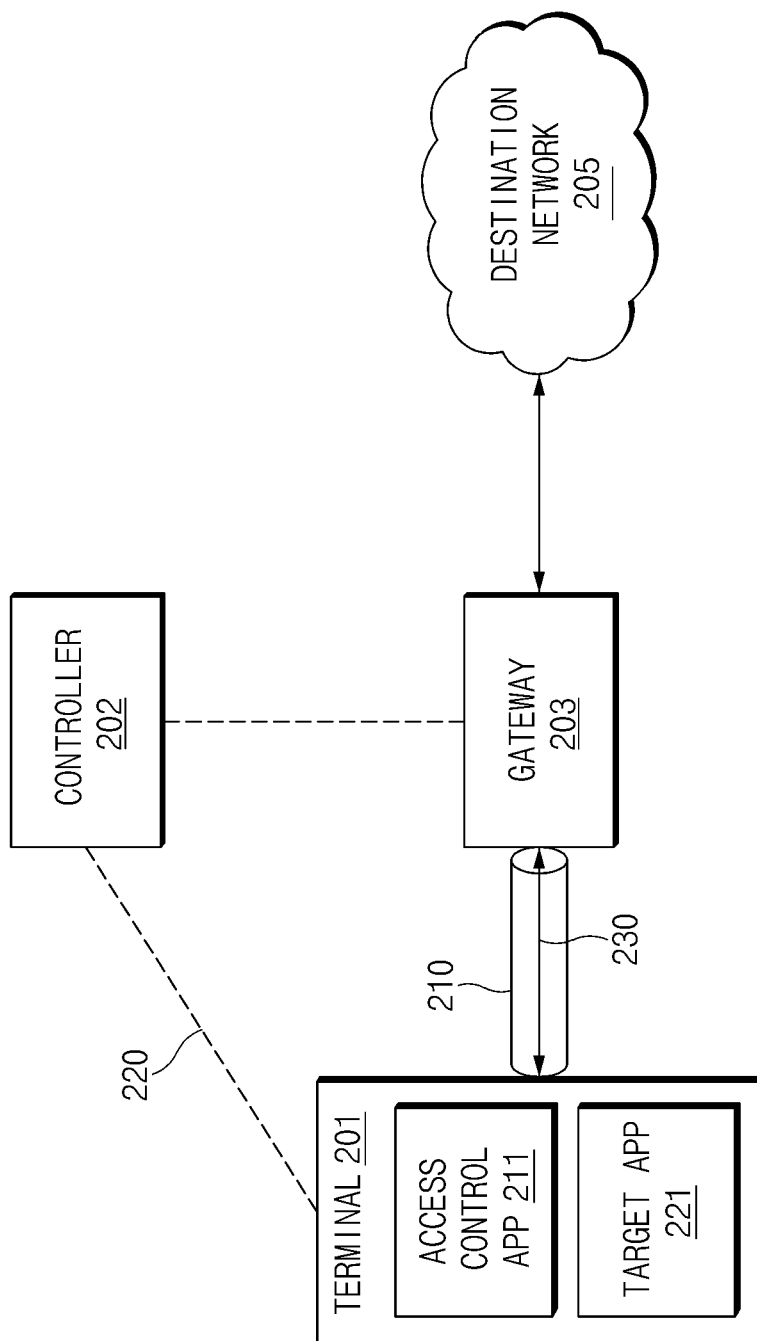
FIG. 2 illustrates architecture in a network environment according to various exemplary embodiments.

FIG. 2 illustrates architecture in a network environment according to various exemplary embodiments.

Referring to FIG. 2, the number of terminals 201, gateways 203, and destination networks 205 is not limited to the number illustrated in FIG. 2. For example, the terminal 201 may transmit data to a plurality of destination networks through a plurality of gateways, and a controller 202 may manage a plurality of terminals and gateways. The terminal 201 may perform the same or similar function as the terminal 101 illustrated in FIG. 1, the gateway 203 may perform the same or similar function as the gateway 103 illustrated in FIG. 1, and the destination network 205 may have the same or similar structure as the first network 10 or the second network 20 of FIG. 1.

The controller 202 may be a server (or a cloud server), for example. The controller 202 may ensure trusted data transmission within the network environment by managing data transmission between the terminal 201, the gateway 203, and other networks (e.g., the destination network 205). For example, the controller 202 may manage the access of the terminal 201 to the destination network 205 through policy information or blacklist information, mediate a generation of an authorized tunnel 210 between the terminal 201 and the gateway 203, or remove the tunnel 210 according to a security event collected from the terminal 201 or the gateway 203. The terminal 201 may communicate with the destination network 205 only through the tunnel 210 authorized by the controller 202, and if the authorized tunnel 210 does not exist, the terminal 201 may be blocked from accessing the destination network 205. According to an exemplary embodiment, the controller 202 may transmit and receive control data packets with the terminal 201 in order to perform various operations (e.g., registration, approval, authentication, update, and termination) related to network access of the terminal 201. A flow (e.g., 220) in which the control data packets are transmitted may be referred to as a control flow.

The gateway 203 may be located at a boundary of a network to which the terminal 201 belongs or a boundary of the destination network 205. The number of gateways 203 may be plural. The gateway 203 may forward only data packets received through the authorized tunnel 210 among the data packets received from the terminal 201 to the destination network 205. A flow (e.g., 230) in which the data packets are transmitted between the terminal 201 and the gateway 203, or between the gateway 203 and the destination network 205 may be referred to as a data flow. According to an exemplary embodiment, the gateway 203 may be connected to the controller 202 on a cloud basis. The gateway 203 may generate an authorized tunnel 210 together with the terminal 201 under the control of the controller 202.

According to various exemplary embodiments, the terminal 201 may include an access control application 211 and a network driver (not illustrated) for managing network access of applications stored in the terminal 201. For example, if an access event of a target application 221 (e.g., any one of applications 110a to 110d in FIG. 1) included in the terminal 201 to the destination network 205 occurs, the access control application 211 may determine whether or not the target application 221 is accessible. If the target application 221 is accessible, the access control application 211 may transmit the data packets to the gateway 203 through the tunnel 210. The access control application 211 may control the transmission of data packets in the terminal 201 through a kernel including an operating system and the network driver.

Figure 3:
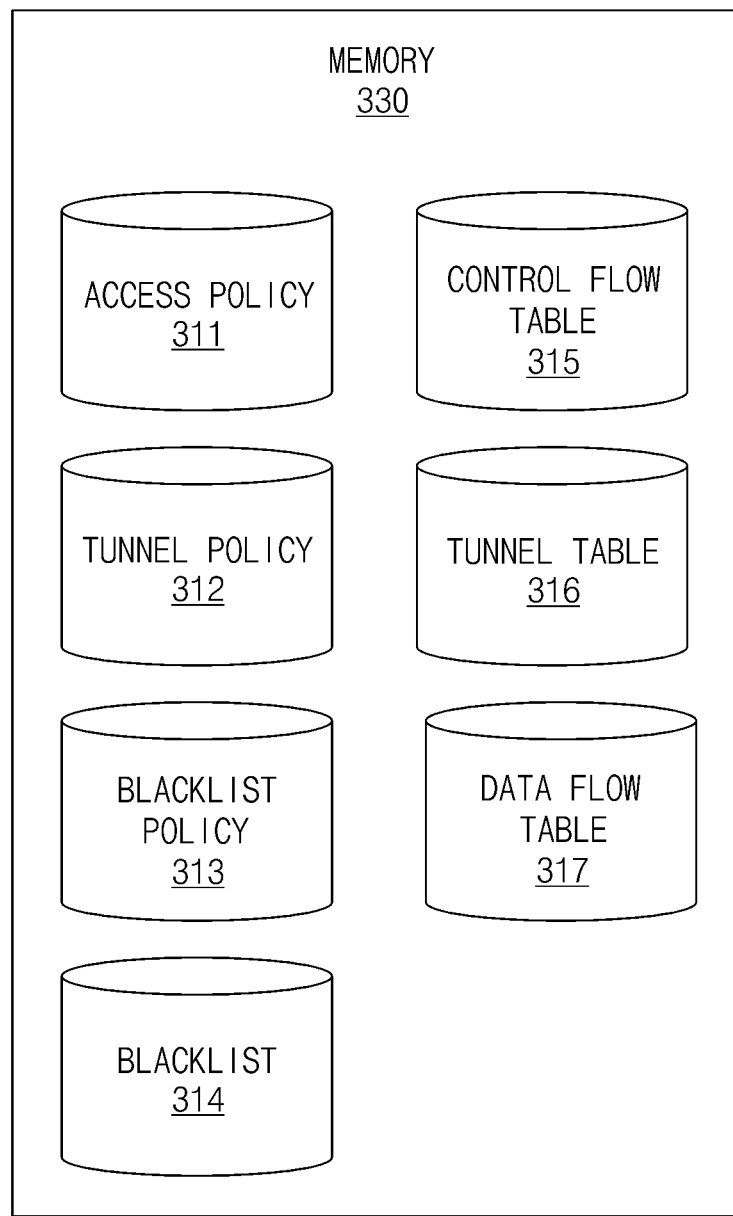
FIG. 3 is a functional block diagram illustrating a database stored in a controller according to various exemplary embodiments.

FIG. 3 is a functional block diagram illustrating a database stored in a controller (e.g., the controller 202 of FIG. 2) according to various exemplary embodiments. Although FIG. 3 illustrates only a memory 330, the controller may further include a communication circuit (e.g., a communication circuit 430 of FIG. 4) for performing communication with an external electronic device (e.g., the terminal 201 or the gateway 203 of FIG. 2) and a processor (e.g., a processor 410 of FIG. 4) for controlling the overall operation of the controller.

Referring to FIG. 3, the controller may store databases 311 to 317 for controlling network access and data transmission in the memory 330.

An access policy database 311 may include information on networks and/or services to which the identified network, terminal, user, or application is accessible. For example, when the terminal requests access to the destination network, the controller may determine whether or not the identified network (e.g., a network to which the terminal belongs), terminal, user (e.g., a user of the terminal), and/or application (e.g., an application included in the terminal) is accessible to the destination network based on the access policy database 311.

A tunnel policy database 312 may include information on the type, encryption method, and encryption level of a tunnel to be connected to a gateway existing at a boundary between a source node (e.g., a terminal) and a network on a connection path. For example, when the terminal requests access to the destination network, the controller may provide an optimal tunnel for accessing the destination network and information about the optimal tunnel to the terminal based on the tunnel policy database 312.

A blacklist policy database 313 may include a policy for permanently or temporarily blocking access of a specific terminal. The blacklist policy database 313 may be generated based on information (e.g., at least one of a terminal identifier (ID), an IP address, a media access control (MAC) address, or a user ID) identified through analysis of the degree of risk, occurrence period, and/or behavior of security events among the security events periodically collected by the terminal or gateway.

A blacklist database 314 may include a list of at least one of the terminal, the IP address, the MAC address, or the user blocked by the blacklist policy database 313. For example, when identification information of the terminal requesting access to the destination network is included in the blacklist database 314, the controller may isolate the terminal from the destination network by rejecting the access request from the terminal.

The control flow table 315 is an example of a session table for managing a flow (e.g., a control flow) of control data packets generated between the terminal and the controller. When the terminal successfully accesses the controller, control flow information may be generated by the controller. The control flow information may include at least one of identification information of the control flow, an IP address that is identified when accessing and authenticating the controller, a terminal ID, or a user ID. For example, when the terminal requests access to the destination network, the controller may determine whether the terminal is accessible and whether the tunnel is generated by searching for control flow information through the identification information of the control flow received from the terminal, and mapping at least one of the IP address, terminal ID, or user ID included in the searched control flow information to the access policy database 311.

According to an exemplary embodiment, the control flow may have an expiration time. The terminal needs to update the expiration time of the control flow, and if the expiration time is not updated for a predetermined period of time, the control flow (or control flow information) may be removed. In addition, when it is determined that immediate access blocking is necessary according to the security event collected from the terminal or gateway, the controller may remove the control flow according to an access termination request of the terminal. When the control flow is removed, the previously generated tunnel and data flow are also removed, so that the access of the terminal to the network may be blocked.

A tunnel table 316 is a table for managing a tunnel connected between the terminal and the gateway. The tunnel may be generated in units of devices or IPs, for example. If the tunnel is generated between the terminal and the gateway, the tunnel table 316 may include tunnel identification information, control flow identification information when the tunnel is dependent on the control flow, a tunnel end point (TEP), a tunnel start point (TSP), a tunnel algorithm, and a tunnel type, and/or additional information for managing the tunnel.

A data flow table 317 is a table for managing a flow (e.g., data flow) in which detailed data packets are transmitted between the terminal and the gateway. The data flow may be generated in a TCP session, an application of a source terminal, or a more detailed unit within the tunnel. The data flow table 317 may include data flow identification information, control flow identification information when the data flow is dependent on the control flow, an application ID for identifying a data flow of an authorized target, a destination IP address, and/or a service port.

Figure 4:
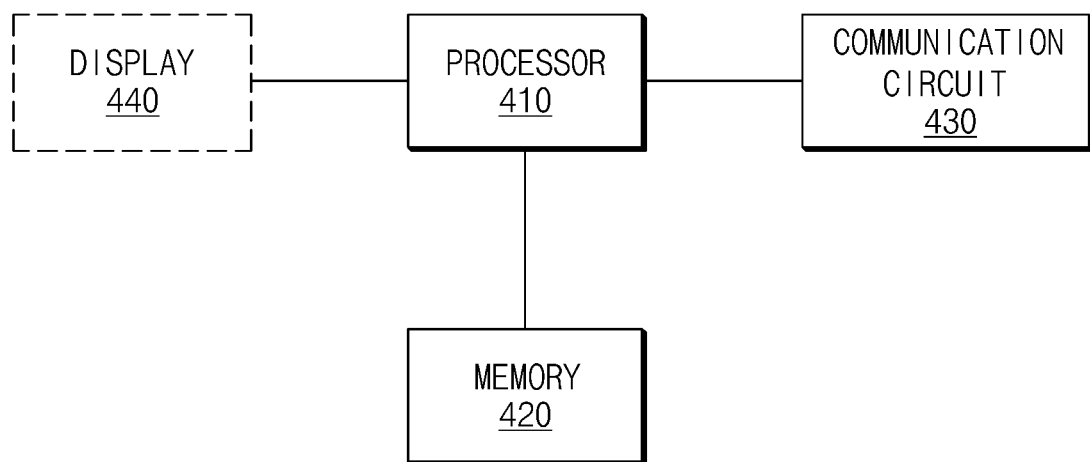
FIG. 4 illustrates a functional block diagram of a terminal according to various exemplary embodiments.

FIG. 4 illustrates a functional block diagram of a terminal (e.g., the terminal 201 of FIG. 2) according to various exemplary embodiments.

Referring to FIG. 4, the terminal may include a processor 410, a memory 420, and a communication circuit 430. According to an exemplary embodiment, the terminal may further include a display 440 to perform an interface with a user.

The processor 410 may control an overall operation of the terminal. In various exemplary embodiments, the processor 410 may include one processor core (single core) or may include a plurality of processor cores. For example, the processor 410 may include a multi-core such as a dual-core, a quad-core, and a hexa-core. According to exemplary embodiments, the processor 410 may further include a cache memory located internally or externally. According to exemplary embodiments, the processor 410 may be configured with one or more processors. For example, the processor 410 may include at least one of an application processor, a communication processor, or a graphical processing unit (GPU).

All or part of the processor 410 may be electrically or operatively coupled with or connected to other components (e.g., the memory 420, the communication circuit 430, or the display 440) in the terminal. The processor 410 may receive commands from other components of the terminal, may interpret the received commands, and may perform calculations or process data according to the interpreted commands. The processor 410 may interpret and process messages, data, instructions, or signals received from the memory 420, the communication circuit 430, or the display 440. The processor 410 may generate new messages, data, instructions, or signals based on the received messages, data, instructions, or signals. The processor 410 may provide the processed or generated messages, data, instructions, or signals to the memory 420, the communication circuit 430, or the display 440.

The processor 410 may process data or signals generated or occurred by a program. For example, the processor 410 may request instructions, data, or signals to the memory 420 to execute or control the program. The processor 410 may write (or store) or update the instructions, the data, or the signals in the memory 420 to execute or control the program.

The memory 420 may store an instruction for controlling the terminal, a control instruction code, control data, or user data. For example, the memory 420 may include at least one of an application program, an operating system (OS), middleware, and a device driver.

The memory 420 may include one or more of a volatile memory or a non-volatile memory. The volatile memory may include a dynamic random access memory (DRAM), a static RAM (SRAM), a synchronous DRAM (SDRAM), a phase-change RAM (PRAM), a magnetic RAM (MRAM), a resistive RAM (RRAM), a ferroelectric RAM (FeRAM), and the like. The non-volatile memory may include a read only memory (ROM), a programmable ROM (PROM), an electrically programmable ROM (EPROM), an electrically erasable programmable ROM (EEPROM), a flash memory, and the like.

The memory 420 may further include a non-volatile medium such as a hard disk drive (HDD), a solid state disk (SSD), an embedded multi media card (eMMC), or a universal flash storage (UFS).

According to an exemplary embodiment, the memory 420 may store some of the information included in a memory (e.g., the memory 330 of FIG. 3) of the controller. For example, the memory 420 may store the tunnel table 316 and the data flow table 317 described in FIG. 3.

The communication circuit 430 may support establishing a wired or wireless communication connection between the terminal and an external electronic device (e.g., the controller 202 or gateway 203 of FIG. 2) and performing communication through the established connection. According to an exemplary embodiment, the communication circuit 430 may include a wireless communication circuit (e.g., a cellular communication circuit, a short-range wireless communication circuit, or a global navigation satellite system (GNSS) communication circuit) or a wired communication circuit (e.g., a local area network (LAN) communication circuit, or a power line communication circuit), and may communicate with an external electronic device through a short-range communication network such as Bluetooth, WiFi direct or infrared data association (IrDA) or a telecommunication network such as a cellular network, the Internet, or a computer network using a corresponding communication circuit among the above-mentioned communication circuits. The various types of communication circuits 430 described above may be implemented as a single chip or may be implemented as separate chips.

The display 440 may output content, data, or signals. In various exemplary embodiments, the display 440 may display image data processed by the processor 410. According to exemplary embodiments, the display 440 may also be configured with an integrated touch screen by being coupled with a plurality of touch sensors (not illustrated) capable of receiving a touch input or the like. When the display 440 is configured with the touch screen, the plurality of touch sensors may be disposed on the display 440 or may be disposed under the display 440.

Figure 5:
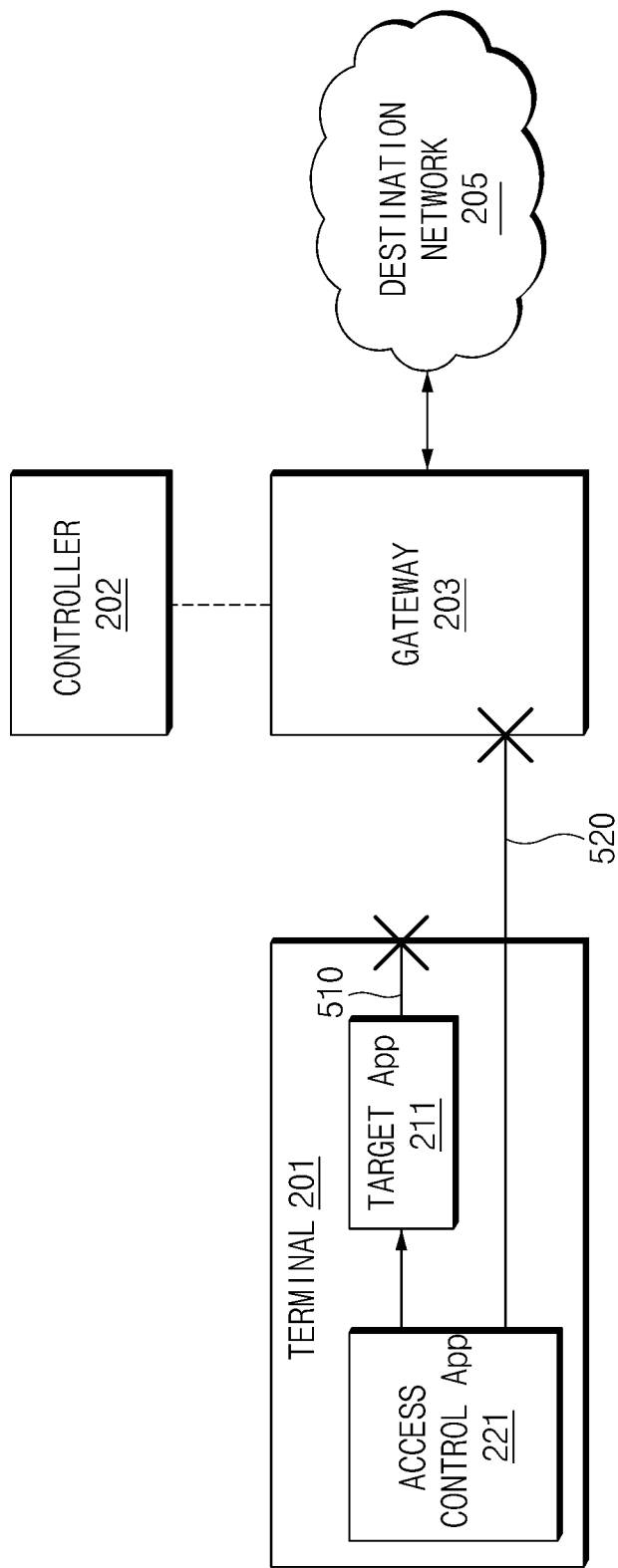
FIG. 5 illustrates an operation of controlling transmission of data packets according to various exemplary embodiments.

FIG. 5 illustrates an operation of controlling transmission of data packets according to various exemplary embodiments.

Referring to FIG. 5, the access control application 211 may detect a request for access of the target application 221 to the destination network 205, or may determine whether or not the terminal 201 or the target application 221 is in a state being accessed to the controller 202. If the terminal 201 or the target application 221 is not in a state being accessed to the controller 202, the access control application 211 may block transmission of data packets from a kernel or a network driver including an operating system (operation 510). Through the access control application 211, the terminal 201 may block access of a malicious application in advance in the application layer of the OSI layers.

According to another exemplary embodiment, when the access control application 211 is not installed in the terminal 201 or the malicious application bypasses the control of the access control application 211, unauthorized data packets may be transmitted from the terminal 201. In this case, since the gateway 203 existing at the boundary of the network blocks data packets received through an unauthorized tunnel (operation 520), the data packets (e.g., data packets for generating a TCP session) transmitted from the terminal 201 may not reach the destination network 205. In other words, the terminal 201 may be isolated from the destination network 205.

Figure 6:
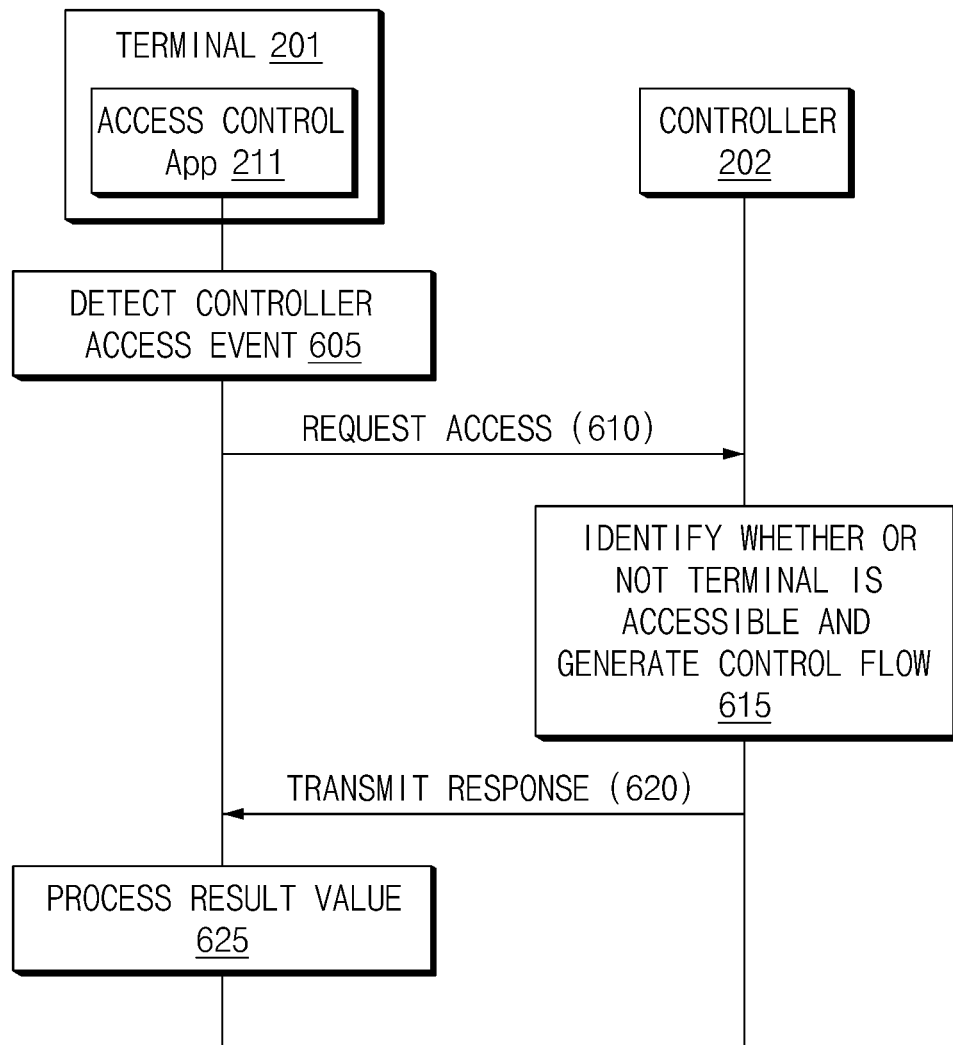
FIG. 6 illustrates a signal flow diagram for controller access according to various exemplary embodiments.
Figure 7:
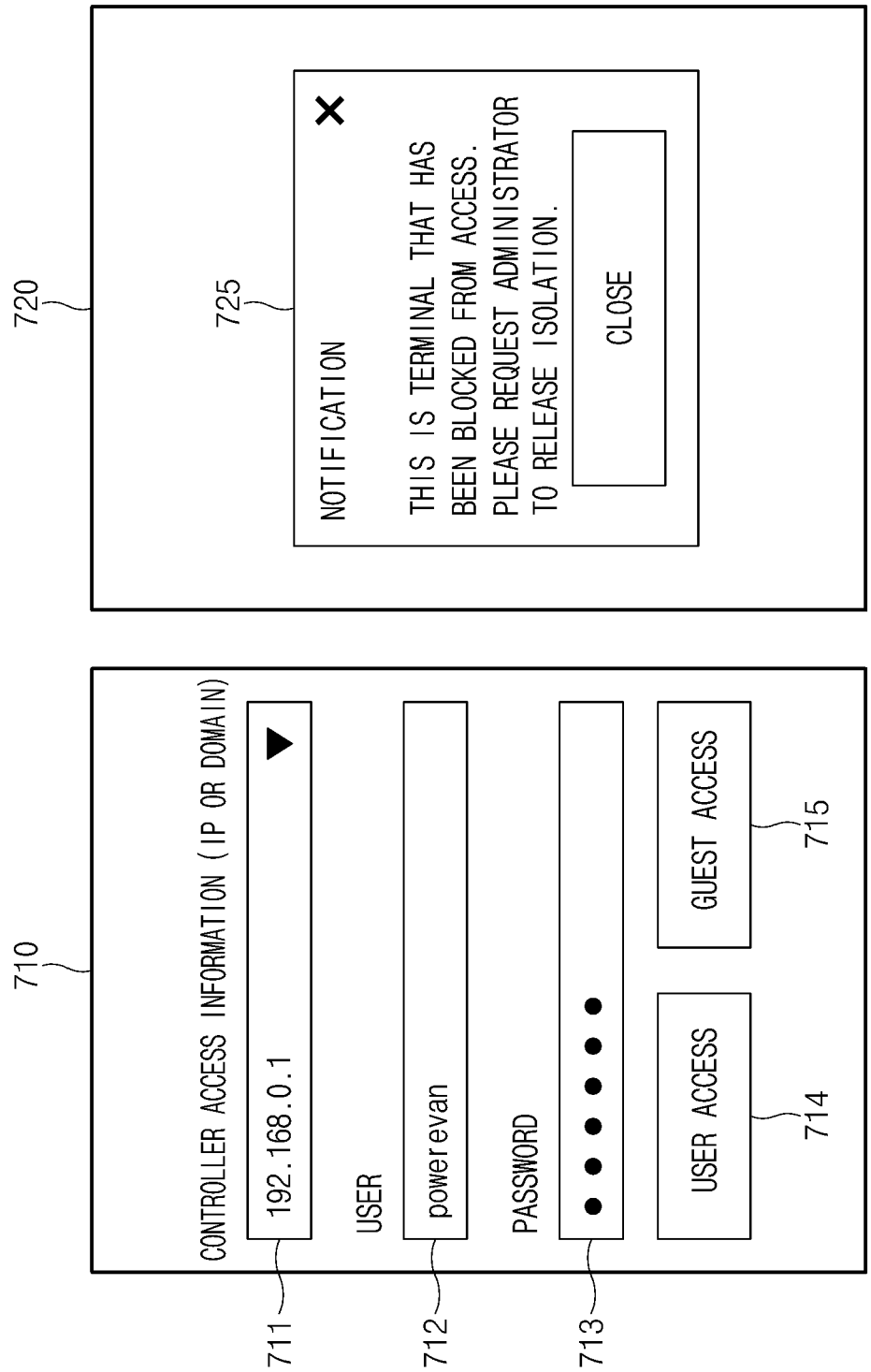
FIG. 7 illustrates a user interface screen for controller access according to various exemplary embodiments.

FIGS. 6 and 7 describe operations for controller access according to various exemplary embodiments. FIG. 6 illustrates a signal flow diagram for controller access and FIG. 7 illustrates a user interface screen for controller access.

Since the terminal 201 needs to be authorized by the controller 202 in order to access the destination network (e.g., the destination network 205 of FIG. 2), the access control application 211 of the terminal 201 may attempt to controller access of the terminal 201 by requesting the controller 202 to generate a control flow.

Referring to FIG. 6, in operation 605, the terminal 201 may detect a controller access event. For example, the terminal 201 may detect that the access control application 211 is installed and executed in the terminal 201 and that access to the controller 202 is requested through the access control application 211.

As an example, referring to FIG. 7, if the access control application 211 is executed, the terminal 201 may display a user interface screen 710 for receiving information necessary for accessing the controller. The user interface screen 710 may include an input window 711 for entering the IP or domain of the controller 202, an input window 712 for entering a user ID, and/or an input window 713 for entering a password. The terminal 201 may detect a controller access event by receiving a button 714 for accessing the controller by an authenticated user after information on the input windows 711 to 713 is input. As another example, if the user authentication of the terminal 201 has not been completed yet, the terminal 201 may detect the controller access event by receiving a button 715 for accessing the controller by the unauthorized user (i.e., a guest).

In operation 610, the terminal 201 may request the controller access to the controller 202 in response to detecting the controller access event. The terminal 201 may request the controller access through the access control application 211. According to an exemplary embodiment, the access control application 211 may transmit identification information (e.g., terminal ID, IP address, and MAC address), type, location, and environment of the terminal 201, identification information of the network to which the terminal 201 belongs, and/or identification information of the access control application 211 to the controller 202.

In operation 615, the controller 202 may identify whether or not the terminal 201 is accessible in response to the received request. According to an exemplary embodiment, the controller 202 may identify whether or not the terminal 201 is accessible based on the database included in the memory (e.g., the memory 330 of FIG. 3) of the controller 202. For example, the controller 202 may identify whether or not the terminal 201 is accessible based on whether or not the information received from the access control application 211 is included in the access policy database, and whether or not the identification information of the terminal 201 and/or the network to which the terminal 201 belongs is included in the blacklist database.

If the terminal 201 is accessible, the controller 202 may generate a control flow between the terminal 201 and the controller 202. In this case, the controller 202 may generate control flow identification information in the form of a random number, and may store the identification information of the terminal 201 and/or the network to which the terminal 201 belongs in the control flow table. The information (e.g., the control flow identification information and/or the control flow information) stored in the control flow table may be used for user authentication of the terminal 201, information update of the terminal 201, policy identification for network access of the terminal 201, and/or a validity check.

If the control flow is generated, the controller 202 may transmit a response to the controller access request to the terminal 201 in operation 620. In this case, the controller 202 may transmit the generated control flow identification information to the terminal 201.

In operation 625, the terminal 201 may process a result value according to the received response. For example, the access control application 211 may store the received control flow identification information and display a user interface screen indicating that the controller access is completed to the user. If the controller access is completed, the network access request of the terminal 201 to the destination network may be controlled by the controller 202.

According to another exemplary embodiment, the controller 202 may determine that the terminal 201 is not accessible. For example, if the identification information of the terminal 201 and/or the network to which the terminal 201 belongs is included in the blacklist database, the controller 202 may determine that the terminal 201 is not accessible. In this case, the controller 202 may not generate the control flow in operation 615 and may transmit a response indicating that the terminal 201 is not accessible in operation 620.

If the terminal 201 receives the response indicating that the terminal 201 is not accessible, the terminal 201 may output a user interface screen indicating that the controller access is impossible to the user in operation 625. For example, referring to FIG. 7, the terminal 201 may display a user interface screen 720 through the access control application 211. The user interface screen 720 may indicate that the access of the terminal 201 is blocked, and may include a user interface 725 that guides isolation release through an administrator (e.g., the controller 202).

Figure 8:
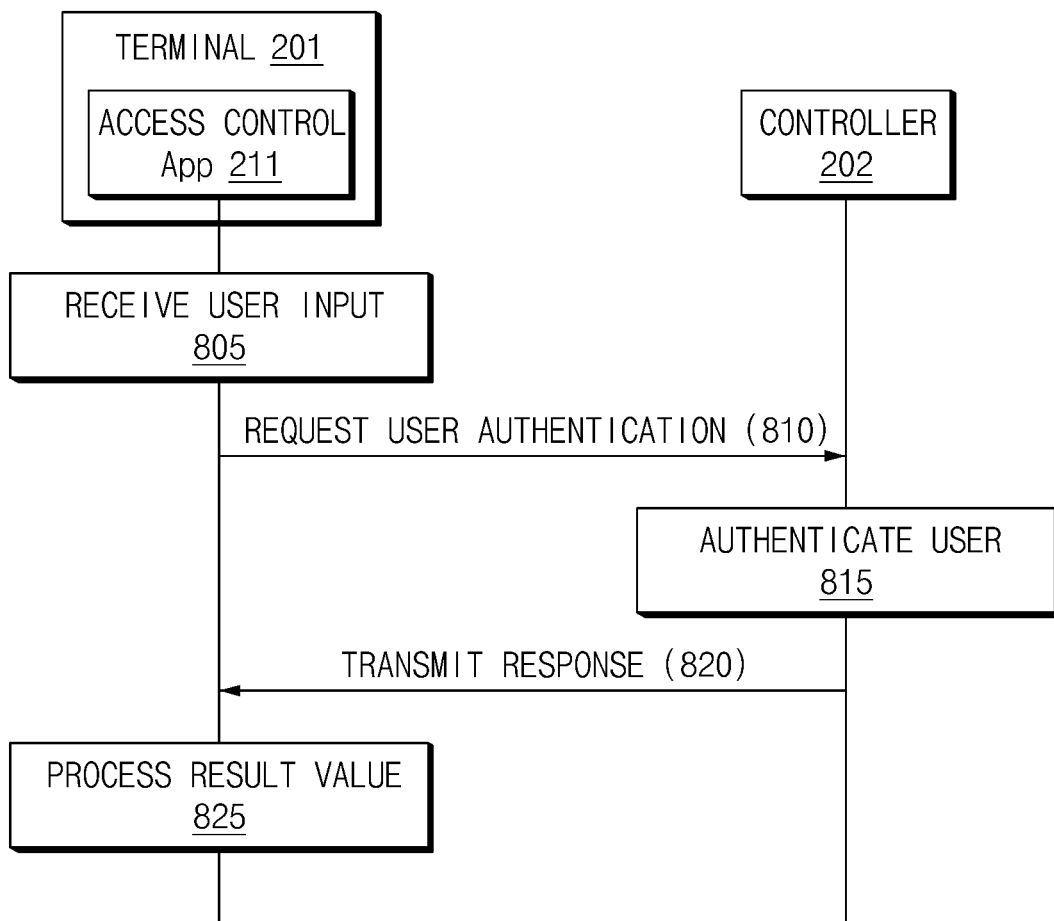
FIG. 8 illustrates a signal flow diagram for user authentication according to various exemplary embodiments.

FIG. 8 illustrates a signal flow diagram for user authentication according to various exemplary embodiments.

In order for the terminal 201 to be granted detailed access privileges to the destination network, the access control application 211 of the terminal 201 may receive authentication for the user of the terminal 201 from the controller 202.

Referring to FIG. 8, in operation 805, the terminal 201 may receive an input for user authentication. The input for user authentication may be, for example, a user input of entering a user ID and password. As another example, the input for user authentication may be a user input (e.g., biometric information) for more enhanced authentication.

In operation 810, the terminal 201 may request the controller 202 for user authentication. For example, the access control application 211 may transmit input information for user authentication to the controller 202. If the control flow between the terminal 201 and the controller 202 has already been generated, the access control application 211 may transmit the input information for user authentication together with the control flow identification information.

In operation 815, the controller 202 may authenticate a user based on the information received from the terminal 201. For example, the controller 202 may determine whether or not the user is accessible according to the access policy and whether or not the user is included in the blacklist based on the user ID, the password, and/or the enhanced authentication information included in the received information, and a database (e.g., the access policy database 311 or the blacklist database 314 of FIG. 3) included in the memory of the controller 202.

If the user is authenticated, the controller 202 may add user identification information (e.g., user ID) to the identification information of the control flow. The added user identification information may be used for controller access or network access of the authenticated user.

In operation 820, the controller 202 may transmit information indicating that the user is authenticated to the terminal 201 in response to the user authentication request.

In operation 825, the terminal 201 may process a result value for user authentication. For example, the terminal 201 may display a user interface screen indicating that the user authentication is completed to the user.

According to another exemplary embodiment, the controller 202 may determine that user authentication is impossible. For example, if the user identification information is included in the blacklist database, the controller 202 may determine that the user authentication is impossible. In this case, in operation 820, the controller 202 may transmit information indicating that the user authentication is impossible to the terminal 201, and in operation 825, the terminal 201 may display a user interface screen indicating that the user authentication has failed.

Figure 9:
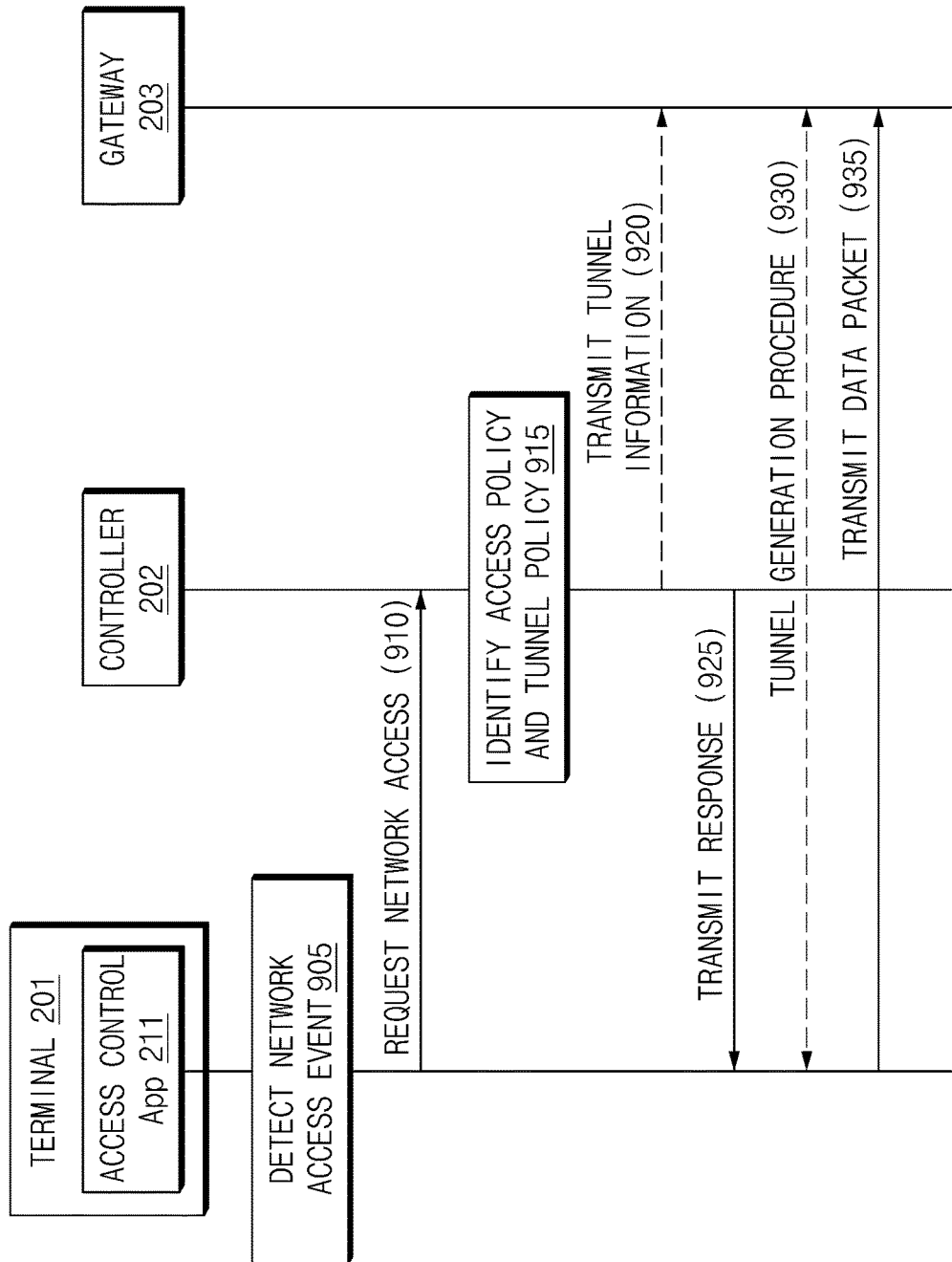
FIG. 9 illustrates a signal flow diagram for controlling network access according to various exemplary embodiments.
Figure 10A:
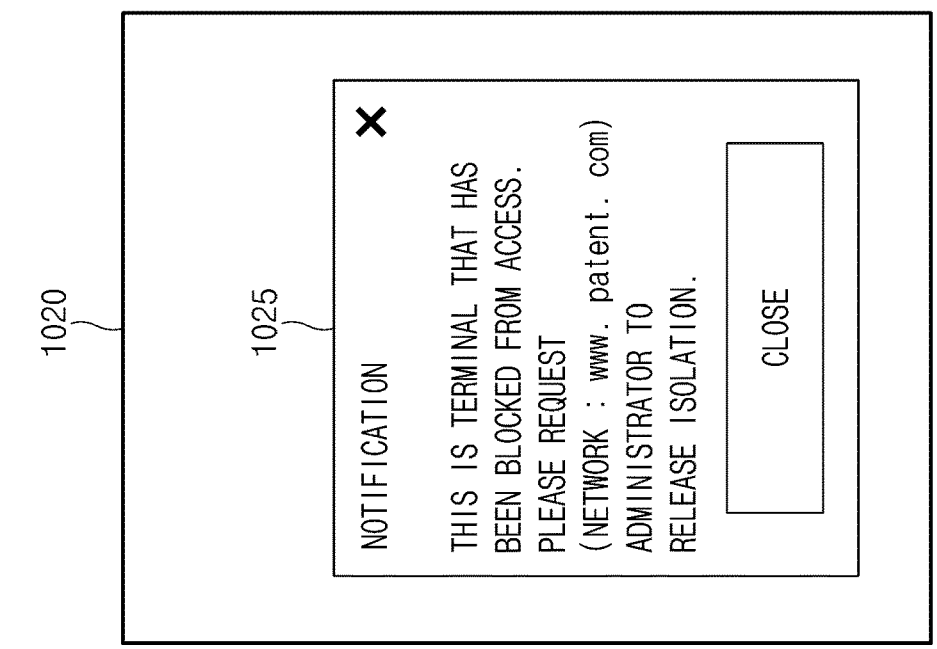
FIG. 10A illustrates a user interface screen when the network access is blocked according to various exemplary embodiments.
Figure 10A:
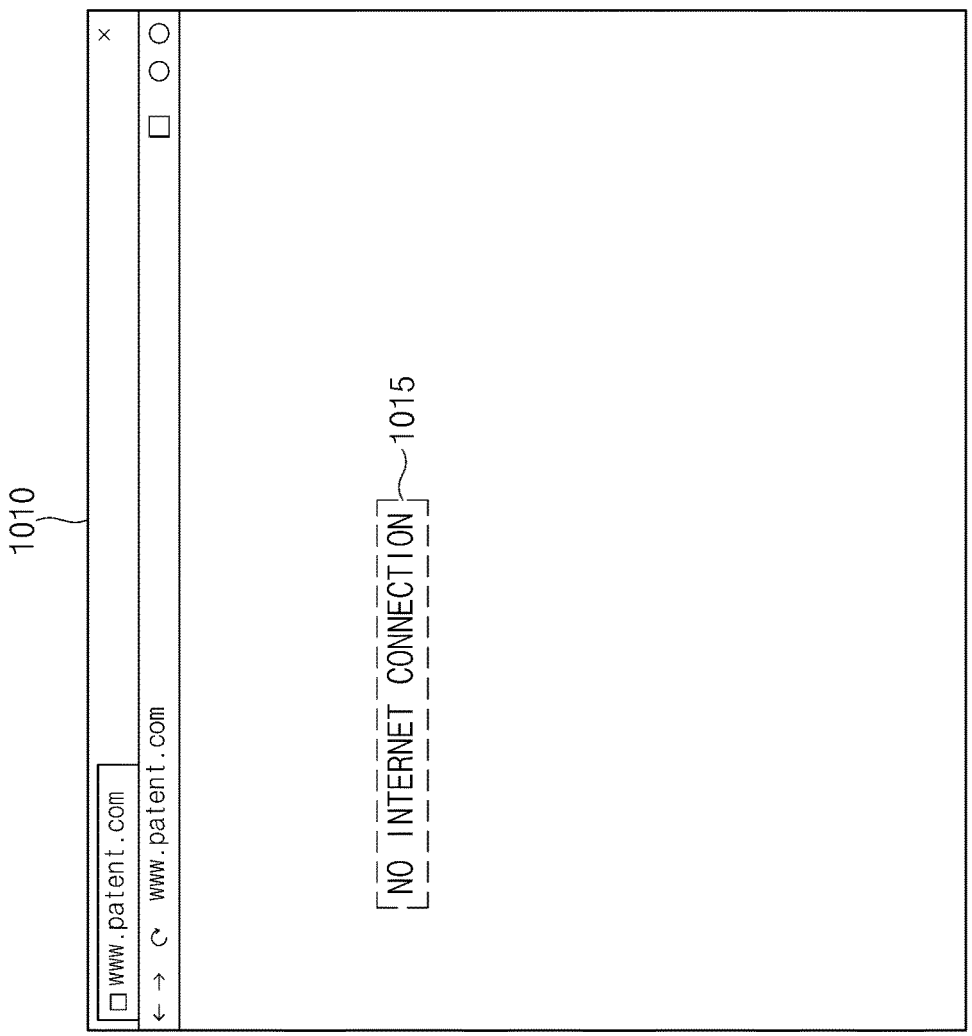
Figure 10B:
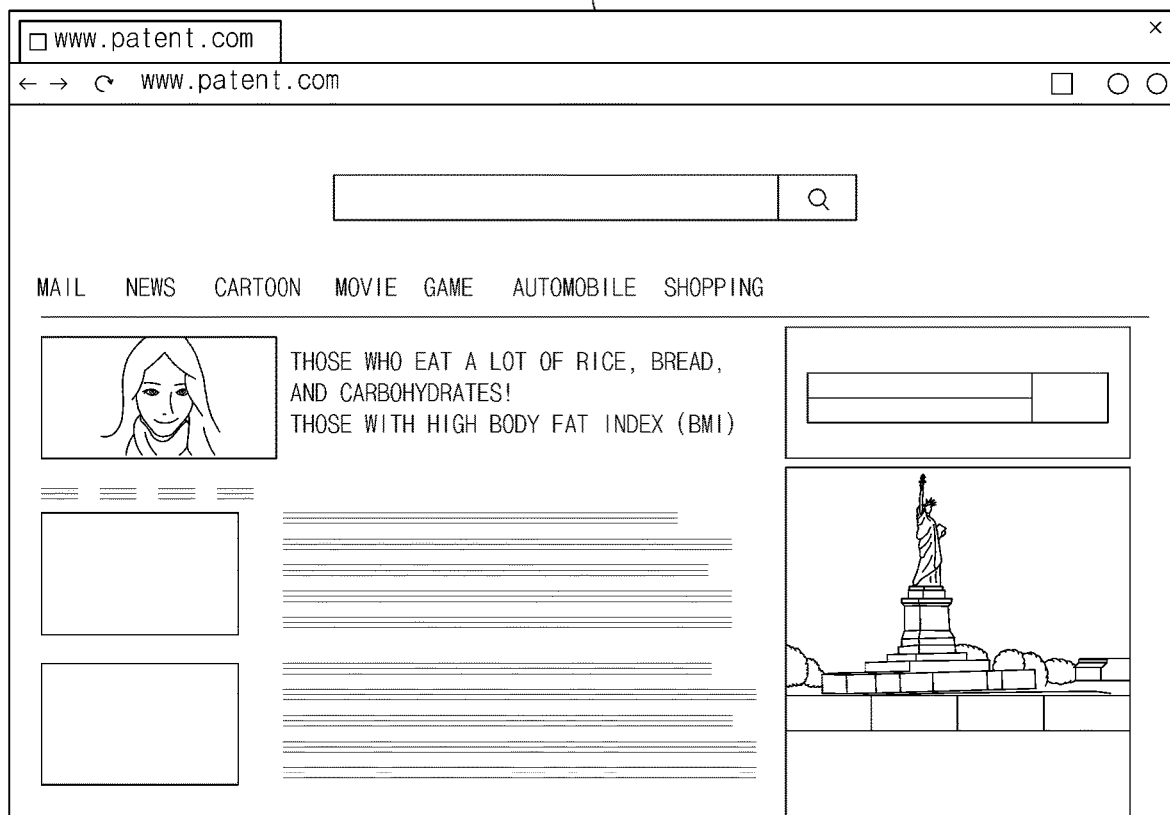
FIG. 10B illustrates a user interface screen when the network access is allowed according to various exemplary embodiments.

FIGS. 9, 10A, and 10B illustrate operations of controlling network access according to various exemplary embodiments. FIG. 9 illustrates a signal flow diagram for controlling network access. FIG. 10A illustrates a user interface screen when the network access is blocked. FIG. 10B illustrates a user interface screen when the network access is allowed.

After the terminal 201 is authorized from the controller 202, the terminal 201 may ensure trusted data transmission by controlling network access of other applications stored in the terminal 201 through the access control application 211 of the terminal 201.

Referring to FIG. 9, in operation 905, the access control application 211 may detect a network access event. For example, the access control application 211 may detect that the target application such as a web browser attempts to access the destination network such as the Internet. For example, the user may execute the web browser and enter and call a web address to which he or she wants to access.

In operation 910, the access control application 211 may request network access of the target application to the controller 202. In this case, the access control application 211 may transmit identification information of the target application, IP of an access target, and/or service port information to the controller 202 together with the identification information of the control flow generated between the terminal 201 and the controller 202.

In operation 915, the controller 202 may identify an access policy and a tunnel policy based on the request received from the access control application 211. For example, the controller 202 may determine whether the target application is accessible based on whether or not the information received from the access control application 211 satisfies the access policy of the controller 202. If the target application is not accessible, the controller 202 may transmit information indicating that access is impossible to the terminal 201 in operation 925. In this case, the access control application 211 may drop a data packet of the target application and display a user interface screen indicating that access to the network is impossible.

If the target application is accessible, the controller 202 may identify whether an authorized tunnel exists between the terminal 201 and the gateway 203. For example, the controller 202 may identify a tunnel end point (TEP) and/or a tunnel type in the tunnel policy corresponding to the destination network, and may determine whether an authorized tunnel corresponding to the identified TEP exists in the tunnel table. If the authorized tunnel exists, the controller 202 may generate a tunnel ID of a previously generated tunnel and information included in the data flow table, and may transmit the generated information to the terminal 201 in operation 925. If the authorized tunnel does not exist, the controller 202 may generate information (e.g., tunnel type, method, authentication information, and/or IP and port of TEP) required for tunnel generation and information included in the data flow table, and may transmit the generated information to the gateway 203 and the terminal 201 (operations 920 and 925).

As another example, if there is no tunnel that satisfies the tunnel policy among the tunnels to be generated between the terminal 201 and the gateway 203, the controller 202 may notify the terminal 201 that the network access is impossible in operation 925. In this case, the access control application 211 may drop a data packet of the target application and display a user interface screen indicating that the network access is impossible.

The access control application 211 may process a result value according to the response received in operation 925. According to an exemplary embodiment, upon receiving information from the controller 202 that the network access of the target application is impossible or that the authorized tunnel does not exist, the access control application 211 may drop a data packet and output a user interface screen indicating that the network access is impossible. For example, referring to FIG. 10A, the terminal 201 may output a user interface screen 1010 or 1020 indicating that access to the destination network is blocked through the display. The user interface screen 1010 or 1020 may include a text 1015 or a pop-up window 1025 indicating that access is blocked.

According to another exemplary embodiment, when the information required for tunnel generation is received from the controller 202, the access control application 211 may generate a tunnel with the gateway 203 in operation 930, and transmit a data packet of the target application through the generated tunnel in operation 935. In this case, the access control application 211 may receive the data packet from the destination network and process data provided by the destination network. For example, referring to FIG. 10B, the terminal 201 may output a screen 1030 provided from the destination network (e.g., a web site) to which access is allowed through the display.

According to another exemplary embodiment, when a tunnel ID of a pre-existing tunnel is received from the controller 202, the access control application 211 may transmit the data packet of the target application to the gateway 203 through a tunnel corresponding to the tunnel ID in operation 935 without performing an additional tunnel generation procedure.

According to an exemplary embodiment, before performing operation 910, the access control application 211 may first identify whether an authorized tunnel exists between the target application and the gateway 203 at the boundary of the destination network. For example, the access control application 211 may identify identification information of the target application, identification information of the destination network (e.g., destination IP), and service port information, and may identify whether a tunnel corresponding to the information identified in the data flow table stored in the memory of the terminal 201 exists. If the authorized tunnel exists, the access control application 211 may transmit the data packet to the gateway 203 through the authorized tunnel in operation 935 without requesting the network access. If the authorized tunnel does not exist, the access control application 211 may request the network access in operation 910.

According to an exemplary embodiment, the access control application 211 may further perform a validity check of the target application before requesting the network access to ensure integrity and stability of the target application. For example, the access control application 211 may determine whether or not the target application is forged or falsified, and perform a code signing check and/or a fingerprint check. As another example, the access control application 211 may identify whether the target application, the access target IP, and the service port are accessible based on the access policy database received from the controller 202. If the validity check of the target application fails, the access control application 211 may drop the data packet without requesting the network access. In this case, the access control application 211 may display a user interface screen indicating that access is impossible. If the validity check of the target application is successful, the access control application 211 may request the network access in operation 910.

Figure 11:
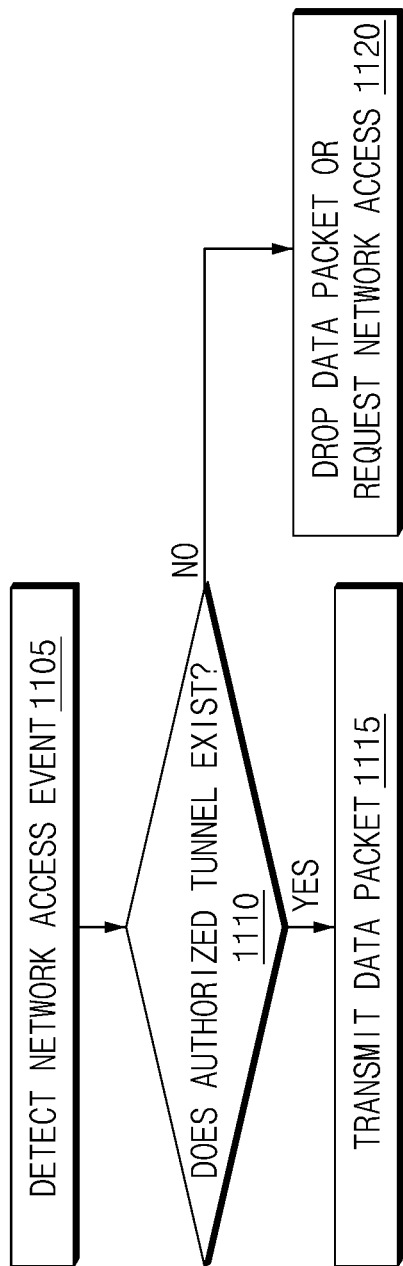
FIG. 11 illustrates an operation flow diagram for controlling network access in a terminal according to various exemplary embodiments.

FIG. 11 illustrates an operation flow diagram for controlling network access in a terminal according to various exemplary embodiments. Operations described below may be performed through the terminal 201 of FIG. 9. For example, the terminal may perform the operations of FIG. 11 by executing instructions stored in the memory through the processor. The instructions stored in the memory may be software or programs such as the access control application 211 of FIG. 9.

Referring to FIG. 11, in operation 1105, the terminal may detect a network access event. For example, if the user attempts to access the destination network through the target application such as a specific web browser, the terminal may detect the network connection event.

In operation 1110, the terminal may identify whether an authorized tunnel exists between the terminal and the gateway at the boundary of the destination network. For example, the access control application may identify whether a tunnel corresponding to the identification information of the target application and the destination network (e.g., the destination IP) exists in the data flow table stored in the terminal. The authorized tunnel may be a tunnel authorized by an external server (e.g., the controller 202 of FIG. 9).

If the authorized tunnel exists, the terminal may transmit a data packet of the target application through the authorized tunnel in operation 1115. If the authorized tunnel does not exist, the terminal may drop the data packet or request the external server for network access in operation 1120.

Figure 12:
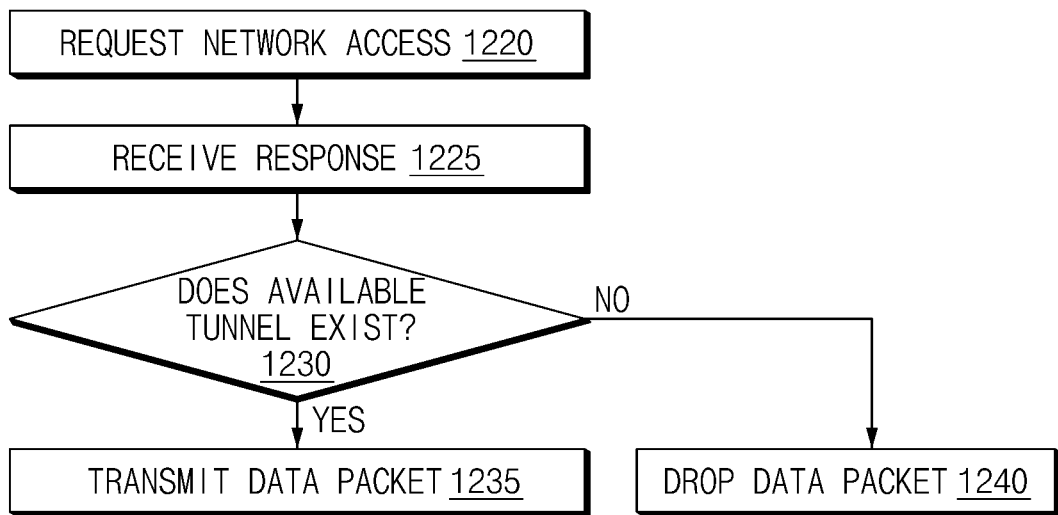
FIG. 12 illustrates another operation flow diagram for controlling network access in a terminal according to various exemplary embodiments.

FIG. 12 illustrates another operation flow diagram for controlling network access in a terminal according to various exemplary embodiments. The operation flow diagram illustrated in FIG. 12 may be performed after operation 1110 of FIG. 11.

If the authorized tunnel does not exist, the terminal may request the external server for network access in operation 1220. The external server may be, for example, a server that manages network access of the terminal, such as the controller 202 of FIG. 9. The terminal may be a terminal registered in the external server through a separate authentication procedure. The authentication procedure may be, for example, the controller access of FIG. 6 or the user authentication procedure of FIG. 8. In this case, a control flow between the terminal and the external server may be generated. According to an exemplary embodiment, the terminal may transmit identification information of the target application, an IP of the access target, and identification information of the control flow between the terminal and the external server to the external server for network access request.

In operation 1225, the terminal may receive a response to the network access request from the external server. The received response may include whether or not the target application may access the destination network, whether or not an authorized tunnel exists between the target application and the destination network, information (e.g., identification information) on the authorized tunnel if the authorized tunnel exists, and/or information required to generate the authorized tunnel if the authorized tunnel does not exist.

In operation 1230, the terminal may identify whether an available tunnel (or a valid tunnel) exists based on the received response. If an already generated tunnel exists or a tunnel that may be generated based on the information received from the external server exists, the terminal may transmit a data packet of the target application through the tunnel in operation 1235. If the available tunnel does not exist, the terminal may drop the data packet in operation 1240.

Figure 13:
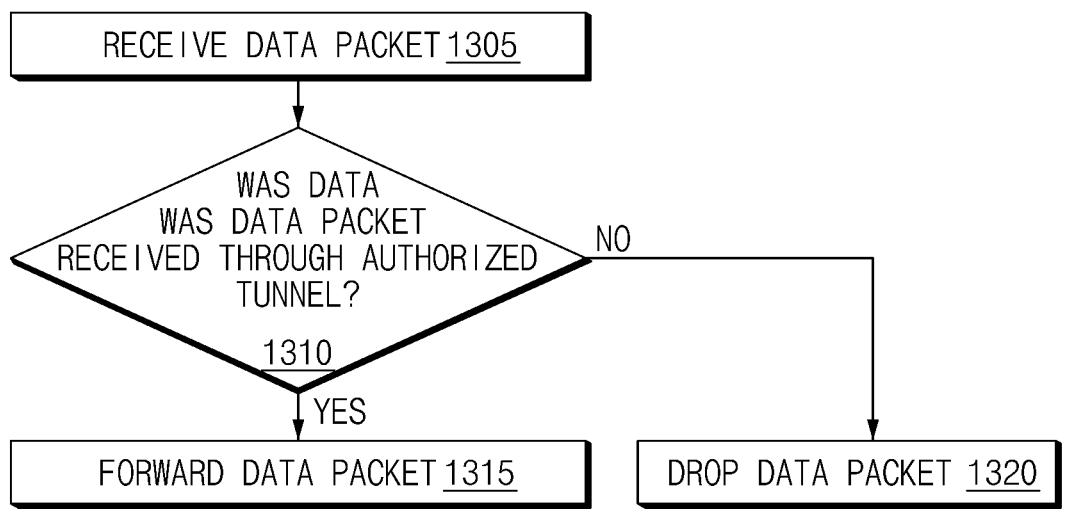
FIG. 13 illustrates an operation flow diagram for controlling network access in a gateway according to various exemplary embodiments.

FIG. 13 illustrates an operation flow diagram for controlling network access in a gateway according to various exemplary embodiments. Operations described below may be performed through the gateway 203 of FIG. 9.

Referring to FIG. 13, in operation 1305, the gateway may receive a data packet from the terminal (e.g., the terminal 201 of FIG. 9).

In operation 1310, the gateway may identify whether or not the received data packet is received through an authorized tunnel. The authorized tunnel may be, for example, a tunnel between the gateway and the terminal generated under the control of an external server (e.g., the controller 202 of FIG. 9).

If the data packet is received through the authorized tunnel, the gateway may forward the data packet to the destination network in operation 1315. If the data packet is not received through the authorized tunnel, the gateway may drop the data packet in operation 1320.

Figure 14:
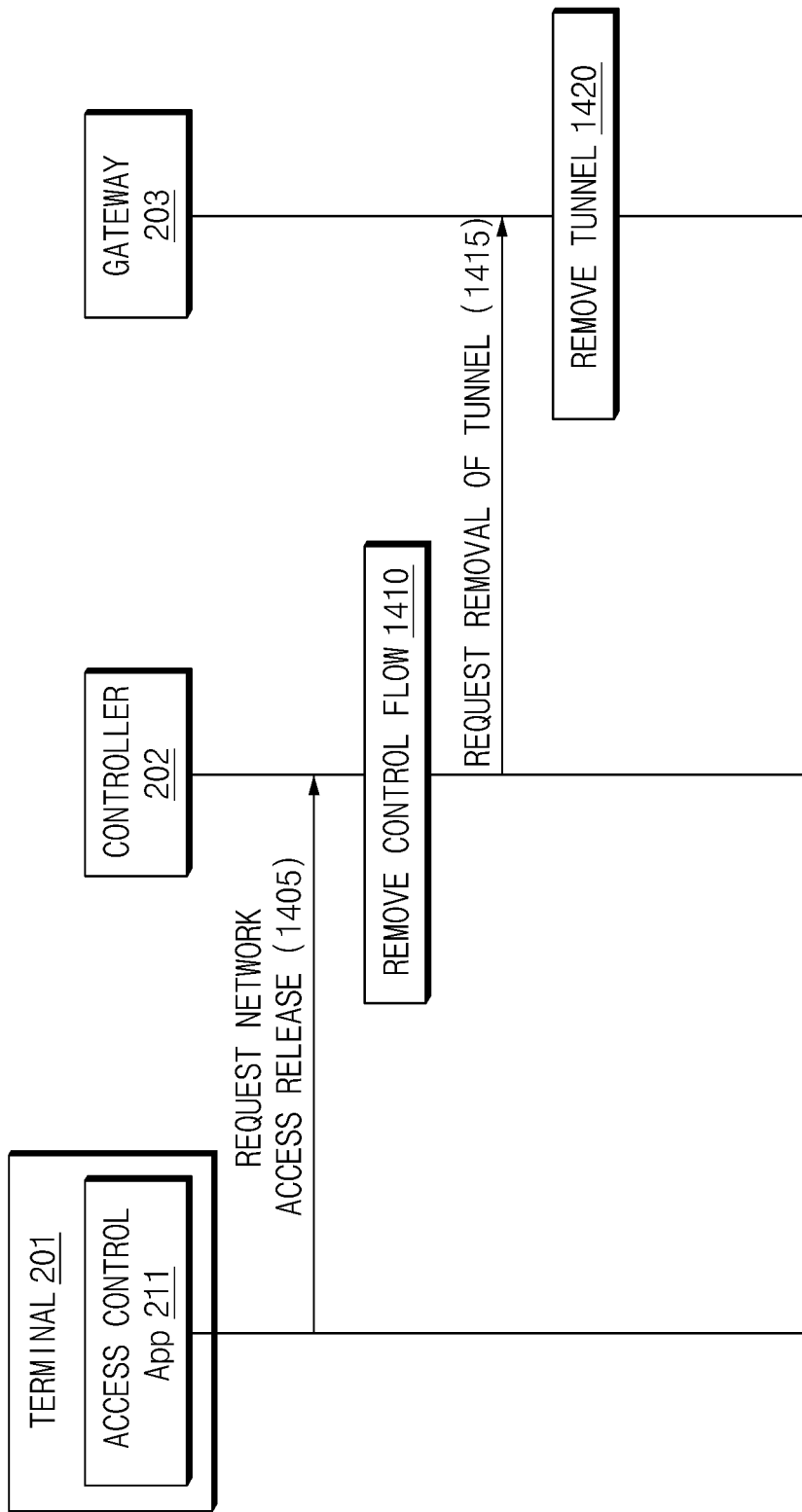
FIG. 14 illustrates a signal flow diagram for releasing network access according to various exemplary embodiments.
Figure 15:
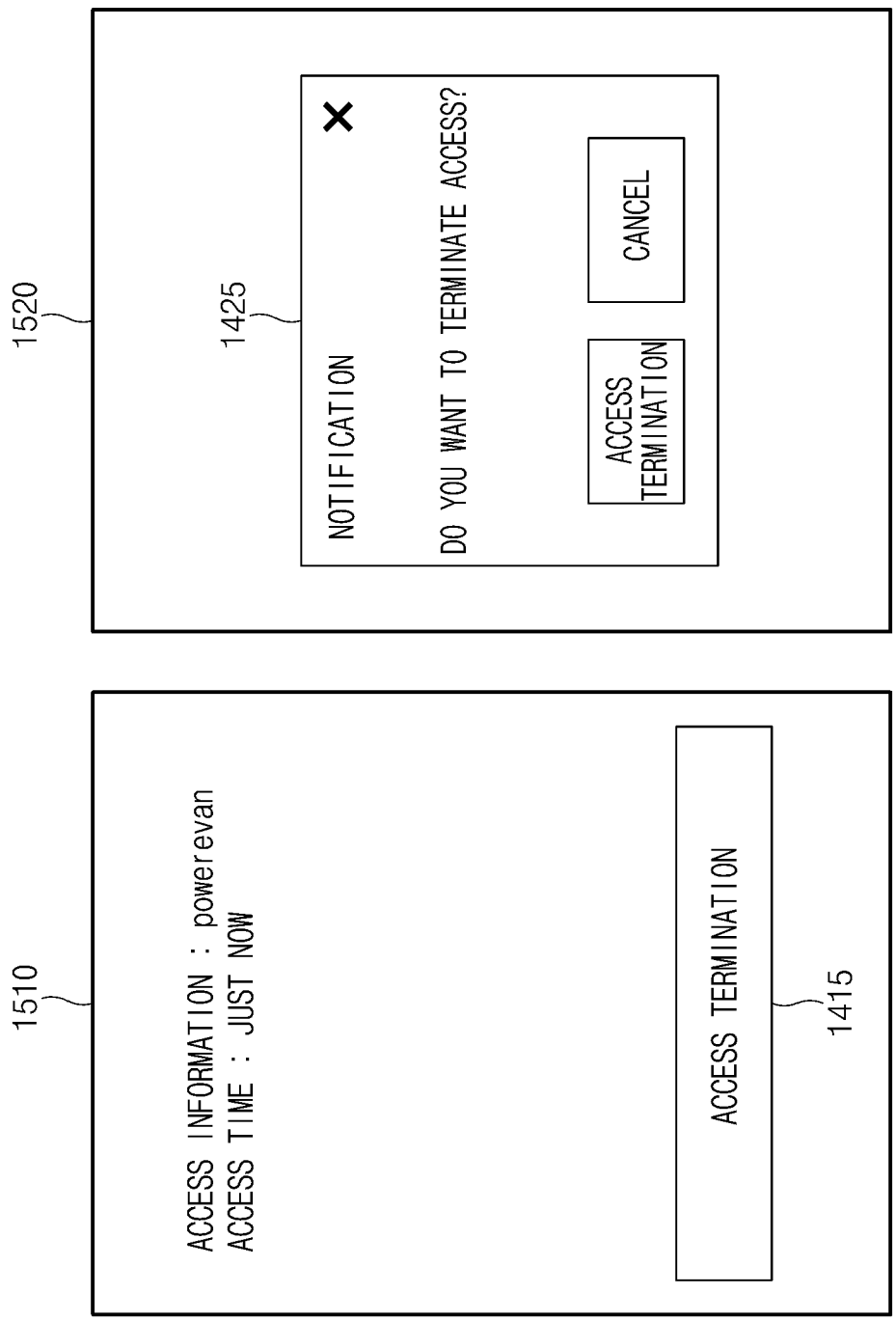
FIG. 15 illustrates a user interface screen for releasing network access according to various exemplary embodiments.

FIGS. 14 and 15 describe operations for releasing network access according to various exemplary embodiments. FIG. 14 illustrates a signal flow diagram for releasing network access and FIG. 15 illustrates a user interface screen for releasing network access.

Referring to FIG. 14, in operation 1405, the terminal 201 may request a network access release for the controller 202. For example, the terminal 201 may transmit identification information of the control flow between the terminal 201 and the controller 202 to the controller 202 together with information requesting the network access release.

According to an exemplary embodiment, the terminal 201 may attempt to release the network access in response to a network access release event such as a request from a user, a restart of the terminal 201, or a request from the access control application 211. For example, referring to FIG. 15, the terminal 201 may receive a user input for selecting an access termination button 1515 on a user interface screen 1510 output through the display. The terminal 201 may confirm the access termination to the user again by outputting a user interface screen 1520 including a pop-up window 1525. As another example, the terminal 201 may immediately perform operation 1405 without outputting the user interface screen 1520.

In operation 1410, the controller 202 may remove (or release) a control flow corresponding to the received identification information in response to the request of the terminal 201.

In operation 1415, the controller 202 may request the gateway 203 to remove a tunnel dependent on the removed control flow. The number of tunnels dependent on the removed control flow may be a large number. In this case, the controller 202 may request a removal of all tunnels dependent on the removed control flow.

In operation 1420, the gateway 203 may remove the tunnel in response to the request of the controller 202. If the tunnel is removed, data packets transmitted to the destination network corresponding to the removed tunnel may be blocked by the access control application 211 or the gateway 203. Through the above-described operations, a system including the terminal 201 may provide complete blocking and isolation of the terminal 201 from the network by releasing the authorized tunnel when necessary.

According to the exemplary embodiments disclosed in the present disclosure, the terminal may block the transmission of data packets from unauthorized applications.

In addition, according to the exemplary embodiments disclosed in the present disclosure, compared to a wide range of IP address-based network security technology such as NAC, it is possible to solve the problem of policy setting and retrieval and prevent bypass attacks.

In addition, according to the exemplary embodiments disclosed in the present disclosure, since it is possible to block a man in the middle attack (MITM) attack in a zero trust network environment, tunnel-based access control may be performed compared to the VPN that provides only section protection.

In addition, according to the exemplary embodiments disclosed in the present disclosure, it is possible to solve the problems inherent in the TCP/IP-based network security technology and provide a secure network connection.

In addition, according to the exemplary embodiments disclosed in the present disclosure, it is possible to solve the problem of setting the policy according to the network control equipment.

Besides, various effects that are directly or indirectly identified through the present disclosure may be provided.

What is claimed is:
1. A terminal comprising:
a display;
a communication circuit;
a processor operatively connected to the display and the communication circuit; and
a memory operatively connected to the processor and storing a target application and an access control application,
wherein the memory stores instructions that when executed by the processor, cause the terminal to:
detect a network access event of the target application to a destination network through the access control application,
request network access of the target application to the destination network to the external server using the communication circuit,
receive a first response to the network access request from the external server, based on the first response:
when a tunnel authorized by the external server exists and the target application is accessible to the destination network, transmit a data packet of the target application through the authorized tunnel using the communication circuit, and
when the authorized tunnel does not exist or the target application is not accessible to the destination network, drop the data packet of the target application.

2. The terminal according to claim 1, wherein the instructions cause the terminal to:
output a screen provided from the destination network using the display, when the authorized tunnel exists and the target application is accessible to the destination network, and
output a user interface screen indicating that access to the destination network is not allowed using the display, when the authorized tunnel does not exist or the target application is not accessible to the destination network.

3. The terminal according to claim 1, wherein the instructions cause the terminal to:
generate the authorized tunnel with a gateway located at a boundary of the destination network using received information, when receiving information for generating the authorized tunnel from the external server, and
transmit the data packet of the target application through the generated tunnel using the communication circuit.

4. The terminal according to claim 3,
wherein the instructions cause the terminal to:
output a screen provided from the destination network using the display, when the data packet is transmitted, and
output a user interface screen indicating that access to the destination network is not allowed using the display, when the data packet is dropped.

5. The terminal according to claim 1, wherein the instructions cause the terminal to:
perform a validity check of the target application based on an access policy database received from the external server, before requesting the network access, and drop the data packet of the target application, when the validity check of the target application fails.

6. The terminal according to claim 1,
wherein the instructions cause the terminal to:
detect a controller access event to the external server through the access control application,
request controller access to the external server using the communication circuit, in response to the detected event,
receive a second response to the controller access request from the external server, and
output a user interface screen indicating that access to the external server is completed or indicating that the access to the external server is blocked through the display, based on the second response.

7. The terminal according to claim 1,
wherein the instructions cause the terminal to:
receive a first user input requesting user authentication,
request user authentication to a user of the terminal to the external server using the communication circuit, the user authentication request including information corresponding to the first user input,
receive a third response to the user authentication request from the external server, and
output a user interface screen indicating that the user authentication is completed or indicating that the user authentication fails through the display, based on the third response.

8. The terminal according to claim 1, wherein the instructions cause the terminal to:
receive a second user input requesting a network access release, and request the network access release to the external server, in response to the second user input.

9. A server comprising:
a communication circuit;
a memory storing a database; and
a processor operatively connected to the communication circuit and the memory, wherein the processor is configured to:
receive a first request that requests network access of a target application stored in a terminal to a destination network from an access control application of the terminal, the first request including identification information of a control flow, identification information of the target application, and identification information of the destination network,
identify whether the target application is accessible based on the identification information of the control flow and the database,
identify whether an authorized tunnel exists between the target application and a gateway of the destination network based on the database, the identification information of the target application, and the identification information of the destination network, when target application is accessible, and
transmit the identified result to the access control application using the communication circuit.

10. The server according to claim 9, wherein the processor is configured to: by using the communication circuit,
transmit identification information of the authorized tunnel, when the authorized tunnel exists,
transmit information required to generate a tunnel, when the authorized tunnel does not exist, and
transmit information indicating that network access of the target application to the destination network is impossible, when a tunnel satisfying a policy included in the database does not exist.

11. The server according to claim 9, wherein the processor is configured to:
receive a second request that requests controller access to the server from the access control application, the second request including identification information of at least one of the terminal, the access control application, or a network to which the terminal belongs,
determine whether the terminal is accessible based on the identification information included in the second request and the database,
generate the control flow, when the terminal is accessible, and
transmit identification information of the generated control flow to the terminal using the communication circuit.

12. The server according to claim 11, wherein the processor is configured to:
receive a third request that requests user authentication to a user of the terminal from the access control application through the control flow, the third request including identification information of the user related to the user authentication, authenticate the user of the terminal based on information included in the third request and the database, and
transmit a result of the user authentication to the access control application through the control flow using the communication circuit.

13. The server according to claim 9, wherein the processor is configured to:
receive a fourth request that requests a network access release from the access control application,
remove the control flow in response to the fourth request, and request the gateway to remove a tunnel dependent on the control flow using the communication circuit.

14. A gateway configured to:
receive a data packet from a terminal,
identify whether the received data packet is received through a tunnel authorized by an external server,
forward the data packet to a destination network, when the data packet is received through the authorized tunnel,
drop the data packet, when the data packet is not received through the authorized tunnel,
receive information required to generate the authorized tunnel from the external server, and
generate the authorized tunnel between the terminal and the gateway based on the information received from the external server.

15. The gateway according to claim 14, wherein the gateway is located at a boundary of the destination network, and
the authorized tunnel is authorized by the external server connected to the gateway based on a cloud.

16. The gateway according to claim 15, wherein the gateway is configured to:
receive a first request that requests a removal of the authorized tunnel from the external server, and
remove the authorized tunnel in response to the first request.

* * * * *